United States Patent Office 3,695,988
Patented Oct. 3, 1972

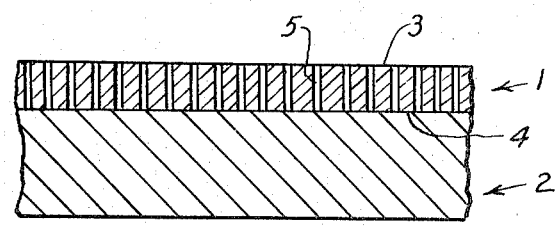
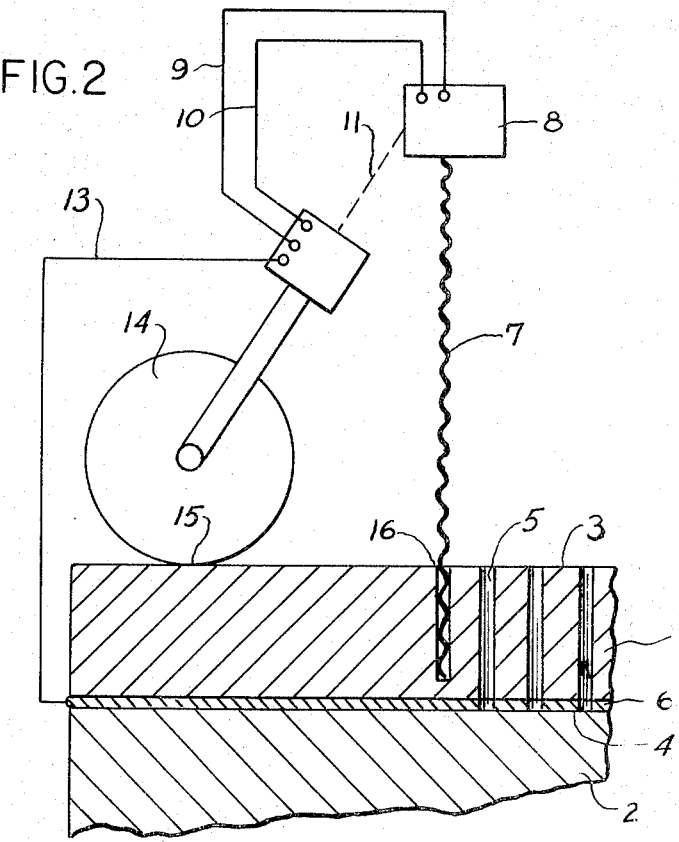

3,695,988
LAMINATED IMITATION LEATHER
Karl Heinz Steigerwald, Mozartstrasse 27,
Lochham, near Munich, Germany
Original application Dec. 8, 1966, Ser. No. 600,122, now Patent No. 3,554,837, dated Jan. 12, 1971. Divided and this application Sept. 2, 1970, Ser. No. 68,999
Int. Cl. B32b 3/10
U.S. Cl. 161—109
8 Claims

ABSTRACT OF THE DISCLOSURE

A laminated imitation leather comprises a first ply of material which is normally substantially impervious and a second ply of pervious material bonded to the first ply, in which said first ply has been rendered pervious to water vapor to a degree comparable to natural leather by forming a large number of small perforation holes therein, and in which said holes penetrate only the first ply and not the second and are characterized by removal from the first ply of material corresponding in volume to the volume of said holes.

---

This application is a division of my prior application Ser. No. 600,122, filed Dec. 8, 1966, now Letters Patent No. 3,554,837 dated Jan. 12, 1971.

The invention concerns a laminated imitation leather and its production, and more especially an imitation leather in which at least one ply is made of a substantially water and water vapour impermeable material, with at least one other ply made of porous, and accordingly permeable/pervious material.

Numerous experiments have been carried out to provide an imitation leather combining the favourable physical and chemical properties of a synthetic material with a degree of porosity corresponding to that of natural leather. Thus attempts were either made to obtain a fibrous prestructure, or to perforate a continuous impervious sheet so as to produce a useful required degree of perviousness. The imitation leather thus obtained are costly because of complex manufacturing methods; their chemical composition may be varied only within close limits, so that precise physical properties cannot always be obtained. The pervious imitation leathers obtained by perforation may be produced from a considerable variety of sheet materials, but their normal structure is so unlike natural leather that it is practically impossible to combine an adequately high thermal insulation with a sufficiently high degree of perviousness to water vapour.

Types of imitation leather are known which with regard to heat conductivity and physical-mechanical properties are very close, or even superior, to natural leather, but are practically impervious to water vapour. Such kinds of imitation leather usually consist of a first ply made of substantially impervious material and a second ply of porous, pervious material. The uppermost ply is so chosen that it gives the required leather-like outward appearance both in looks and feel, whilst the subsequent plies supplement this by suitable mechanical and other physical properties such as e.g. a low degree of heat conductivity, and a high degree of strength. The innermost ply in most cases consists of textile backing such as fleece or fabric. Hitherto if it was necessary for imitation leather to be made pervious to water vapour, the whole structure was perforated. With such a structure the properties of the lower plies, more especially strength and good heat insulation, were lost for a greater part, since the perforations weaken these plies and to a considerable extent promote heat transfer by convection. For technical reasons the perforations and their spacings are generally selected to be so large that although the perviousness to water vapour measured over a large area did in fact appear sufficient, the perviousness of the regions located between the individual perforation holes was insufficient, so that for example, when using the imitation leather for furniture coverings or shoe uppers, adequate ventilation was not obtained.

The object of the invention is to provide laminated imitation leather of the kind referred to, which avoids the disadvantages described and combines a high degree of water vapour perviousness comparable with natural leather with a low heat conductivity and high degree of strength and which is cheap to produce.

In accordance with the invention the object is attained in a laminated imitation leather consisting of at least two plies of sheet material in that a first ply is provided with a member of small holes per unit area which do not continue into a second ply, and which impart the required perviousness to the imitation leather.

The fact that the large number of fine holes do not continue into the second ply is of considerable importance, since the prevents the greatly desired good heat insulating properties of the second ply from being impaired. On the other hand it is also important that the holes in the first layer are continuous, and that no blocking of the holes occurs as by adhesive between the first and the second plies. The distribution of a large number of fine holes over the whole perforation area overcomes the described lack of comfort of hitherto known imitation leather with perforated ply.

The problems encountered when producing imitation leather in accordance with the invention are overcome by a manufacturing method in which the holes are produced by the action of an energy-carrying ray acting on the impervious ply or plies (hereinafter always referred to as "first ply"), the duration of action, the cross-section and the output energy of the energy-carrying ray being so selected for each hole that the energy-carrying ray completely bores through the impervious ply, but no more.

In contrast with known perforated imitation leathers, only the impervious plies are perforated. Producing holes by means of an energy-carrying ray is particularly advantageous, because the holes are formed speedily and neatly, and because the material from the holes is removed by evaporation, so that no gradual closing of the holes by material trickling back occurs; it may also be of importance that the inside wall surfaces of the holes, due to the high temperatures necessarily occurring during evaporation, are compacted in the manner of a fused edge. The perforation of the first ply only may be effected in accordance with the invention by the fact that this ply is separately produced, then perforated and finally bonded to the remaining plies. Generally however this involves difficulties since there is the risk that the holes in the already perforated ply may be blocked up. Therefore provision is made in accordance with the invention to perforate the first ply after it has been bonded to at least one of the underlying plies. Preferably, perforation occurs after all plies have been bonded together. In this case the imitation leather is perforated from the direction of the first ply. The parameters of the energy-carrying ray are so chosen that the perforations penetrate only the ply impervious to water vapour, the pervious plies adjacent thereto in the direction of the ray, being substantially untouched. The use of an energy-carrying ray to produce holes in laminated imitation leathers has the advantage, that usually the second ply, owing to its lower density, is less able to absorb radiation energy than the first ply; this ensures that a properly adjusted ray perforates only the first ply, and leaves the second ply substantially undamaged.

Further features and advantages of the invention become evident from the exemplary description below, which should be read in conjunction with the accompanying drawing.

FIG. 1 shows schematically a cross-section through imitation leather in accordance with the invention.

FIG. 2 describes schematically a manufacturing method in accordance with the invention.

The example of imitation leather in accordance with the invention shown in FIG. 1 comprises a first ply 1 of a substantially impervious material, for example, a polyurethane foil of 0.6 mm. thickness, which may be mixed with a filler or may be dyed; the filler may be iron oxide $Fe_2O_3$ in the proportion of 3:1 by weight. A second ply 2 may consist of a synthetic textile fleece, which is cemented to the first ply 1 and is about 1.0 mm. thick. The first ply 1 has a large number of fine bores 5 formed therein, for example, 2000 bores per cm.$^2$, each bore having a diameter of about 0.03 mm. From the figures mentioned, which are by way of example, it can be seen that the entire perforation cross-section would amount to about 1.5% of the foil area; this makes it apparent that in an imitation leather in accordance with the invention the physical and mechanical properties remain practically unchanged relative to the imperforate material. The sum of the hole areas in the stated numerical values however is such that a perviousness to water vapour in the order of magnitude of a few millimeters per cm.$^2$ per hour is obtained, and this is comparable with natural leather. Preferably no less than 1000 holes per cm.$^2$ are formed, and the cross-section of the holes is such that a predetermined perviousness to water vapour results, preferably of the same order of magnitude as in natural leather. It is of course also possible to provide more than two plies, more particularly if they are pervious and of varying fibre or pore structure.

To produce the perforations it is required that the surface 6 (FIG. 2) on the second ply and between the second ply 2 and the first ply 1 has a reasonably high electric conductivity; it may be produced by a metalization process, preferably applied by evaporation, and a suitable conductivity figure is 0.01 (ohms/cm.$^2$)$^{-1}$. Of course it is possible for this metalization to be replaced by any other kind of conductive surface. The thickness of the electrically conductive surface 4 of the first ply varies with the thickness of the first ply 1.

Imitation leather in accordance with the invention is produced by forming the holes 5 by means of a highly focused energy-carrying ray of high acceleration potential. On the right of FIG. 2, it is indicated schematically that a thin ray 7 from a ray generator 8 of suitable type is directed vertically against a point 16 on the exposed surface 3 of layer 1, this ray being in the process of making a hole 16. Ray source 8 and imitation leather 1, 2 are moved relative to one another, in FIG. 2 in such a manner that the ray source 8 moves across the imitation leather from right to left and at the required hole positions the movement is briefly interrupted and the ray switched on. The duration of action, the cross-section and the energy current of the ray are so chosen that the ray bores right through the first ply without damaging the second ply 2 below. These working conditions may be readily maintained in an imitation leather which is composed of a relatively thick, firm first ply 1 with a relatively loose ply 2 of less density. Since absorption of the energy-carrying ray is determined by the density of the absorbing material, the first ply 1 absorbs most of the ray energy and is pierced through at high speed; on the other hand the absorption of ray energy in the second ply 2 is much smaller, so that with suitable adjustment of the ray, more particularly its impulse duration, the first ply can be pierced, completely whilst leaving the second ply undamaged. This method of operation completely circumvents all problems which result from subsequent bonding of a perforated first ply with a porous second ply such as that in the plane of the bores are gummed up or at least become constricted in the adhesive plane. The fact that the second ply 2, which is responsible for good heat insulation, remains substantially undamaged, is of decisive importance for the properties of the completed imitation leather, since slight perforation or even only some damage to the second ply would reduce its mechanical strength and heat insulation. In the example of imitation leather already referred to, comprising a first ply 1 of polyurethane of about 0.6 mm. thickness and a second ply 2 made of a synthetic textile fleece of 1.0 mm. thickness, an electron ray having 140 kv. acceleration potential, 0.02 mm. ray diameter and about 4 ma. ray current may be used for piercing. The impulse duration required for boring a hole amounts to only a few micro-seconds, so that the 2000 holes required per square centimetre may be formed in a very short period, more particularly if the ray is guided successively by electronic deflection to the individual boring positions. The timed interval between two successive boring operations may amount to about $10^{-4}$ to $-10^{-5}$ sec. The extremely small holes specified are obtainable with modern ray generating instruments without any particular difficulties. Thus, the electron ray as described, with an initial diameter of about 0.02 mm. may have a divergence angle of only 2 to 3 degrees. The high energy obtainable in the ray causes the material at the boring point to be evaporated practically instantly and completely removed from the bore hole. This is in complete contrast to mechanical methods in which it is not possible to produce very small bores in a short time with complete removal of the boring core. Perforations produced by needles are completely useless from a practical point of view, since the material displaced when the needle punctures it, returns into the punctured hole. This is completely avoided in the method of production in accordance with the invention, even in materials with a tendency to cold flow, since the bore hole wall surface is compacted into a fused crust.

In practice irregularities in the thickness of the sheet to be perforated are inevitable. If however there is only a small difference between the densities of the plies 1 and 2, it may be necessary to adjust the ray with a high degreee of accuracy to the first ply. In order to avoid damage in such cases to the second ply at those points where the first ply is excessively thin, and conversely to ensure a complete perforation through the first ply 1 at those points where it is thicker, it is possible in accordance with the invention for the thickness of the ply 1 to be measured directly before perforation and to employ the measuring signal obtained to control the ray. For this purpose, for example, when producing imitation leather, the sheet of the first ply 1 is treated on one side by evaporation or spraying on of an electrically conductive material in such a manner that a high surface conductivity results. The sheet is then placed on the second ply and bonded thereto as by cementing. The structure of an imitation leather created thereby is indicated schematically in FIG. 2, where the conductive surface is shown as the layer 6 (shown excessively thickened). This electrically conductive surface 6 of the first ply permits the thickness of the ply to be measured electrically by means of a thickness scanner placed on the upper surface 3. Thickness measuring instruments of this kind, operating by capacitance measurement, are known and are not here described in detail. The measuring signal supplied directly by the thickness measuring instrument is used to control the ray intensity. The thickness scanner shown in FIG. 2 includes a roller 14 which at 15 is supported on the surface 3 and is attached to a thickness measuring instrument or measuring head 12. The instrument 12 is connected by means of a mechanical connection 11 with the ray head S or with a movement device (not shown) coupled with a ray deflecting device, so as to travel a predetermined distance ahead of the ray over the surface 3. At 13 a connection between the thickness measuring instrument 12 and the conductive surface 6 is indicated. For electric thickness measuring instruments of the kind referred to, a relatively low degree of surface conductivity of the surface 4 suffices, for example in the order of magnitude of 0.01 cm.$^2$ per ohm. The measuring signal supplied by the thickness measuring instrument is used for automatically controlling the ray insensity and thus the depth of bore produced. In FIG. 2 this is schematically indicated by the leads 9 and 10 between thickness measuring instrument 12 and ray source 8. Constructing such control devices presents no difficulties to the expert.

An electron ray is preferably used as energy-carrying ray in the method in accordance with the invention. It is of course also possible to use several ray sources simultaneously. This is expedient especially with relatively wide strips of imitation leather which are to have holes formed continuously therein.

I claim:

1. A laminated imitation leather comprising a first ply of substantially impervious material and a second ply of pervious material bonded to the first ply, in which the first ply has a large number of small perforation holes per unit area formed therein, the size of said holes being so small that the first ply is substantially impervious to liquid water but pervious to water vapor, the number of holes per unit area being such that said first ply has a perviousness to water vapor of at least one milligram per square centimeter per hour, said holes penetrating only the first ply and not the second and being characterized by removal from the first ply of material substantially corresponding in volume to the volume of said holes.

2. An imitation leather according to claim 1, in which the size and spacing of the holes are such that the mechanical properties of the first ply are substantially unchanged thereby.

3. An imitation leather according to claim 1, in which the number of said holes per unit area is at least 1000 per square centimeter.

4. An imitation leather according to claim 1, in which the cross-section of the holes is such that a perviousness to water vapor is obtained similar to that of natural leather and thus lying in the order of magnitude of a few milligrams per square centimeter an hour.

5. An imitation leather according to claim 1, in which the second ply consists of textile fleece.

6. An imitation leather according to claim 1, in which the surface of the first ply adjoining the second ply is electrically conductive.

7. An imitation leather according to claim 6, in which said surface is provided with an electrically conductive layer, preferably a metal layer, this thickness of which is chosen to produce the desired degree of surface conductivity.

8. An imitation leather according to claim 1, in which the walls of the holes are hardened in the form of a fused crust.

References Cited
UNITED STATES PATENTS

| | | | |
|---|---|---|---|
| 2,726,977 | 12/1955 | See et al. | 161—113 |
| 2,858,248 | 10/1958 | Hastings et al. | 161—220 |
| 2,994,617 | 8/1961 | Proctor | 161—112 |
| 3,296,016 | 1/1967 | Murphy | 161—DIG 4 |
| 3,360,394 | 12/1967 | Griffin et al. | 161—DIG 4 |
| 3,403,046 | 9/1968 | Schwacke et al. | 161—DIG 4 |
| 3,486,968 | 12/1969 | Mater | 161—DIG 4 |

MORRIS SUSSMAN, Primary Examiner

U.S. Cl. X.R.

161—159, 190, 220, 151, DIG 002